Sept. 27, 1955 N. E. ANDERSON 2,719,245
WIRE FEEDING SYSTEM FOR WELDING APPARATUS
Filed Jan. 5, 1952 3 Sheets-Sheet 1

INVENTOR
NELSON E. ANDERSON
BY
ATTORNEY

Sept. 27, 1955        N. E. ANDERSON        2,719,245

WIRE FEEDING SYSTEM FOR WELDING APPARATUS

Filed Jan. 5, 1952        3 Sheets-Sheet 2

INVENTOR
NELSON E. ANDERSON
BY
H. Hume Mathews
ATTORNEY

# United States Patent Office 2,719,245
Patented Sept. 27, 1955

2,719,245

WIRE FEEDING SYSTEM FOR WELDING APPARATUS

Nelson E. Anderson, Berkeley Heights, N. J., assignor to Air Reduction Company, Incorporated, New York, N. Y., a corporation of New York Application January 5, 1952, Serial No. 265,061

7 Claims. (Cl. 314—69)

This invention relates to manual electric arc welding in which a filler wire from a reel passes through a flexible casing and is fed to a welding gun. The invention is intended primarily for use with a manual, inert-gas-shielded metal arc welding apparatus such as disclosed in Patent No. 2,504,868, issued to Muller et al. on April 18, 1950, although it can be used with other welding apparatus.

It is an object of this invention to provide a dependable manual welding system in which the filler wire is pulled to an easily-manipulated welding gun through a flexible casing.

A further object is to provide an improved, labor-saving manual welding system in which the filler wire is pushed to a welding gun and the rate of feed of the wire can be regulated at the gun.

In order to provide flexibility of operation in electric arc welding using a consumable electrode filler wire, a manual welding gun, a remotely-located fixed base carrying a wire reel, and a flexible casing for the wire extending between the base and the gun have heretofore been used. A feed mechanism on the fixed base pushed the wire through the casing and gun. This arrangement is known as a "push-type" apparatus. With this "push-type" arrangement, a welding operator can move with ease to different work pieces and can make welds at various points on large work pieces. The fixed base, in practice, took the form of a heavy portable trailer. The electrode-filler wire was withdrawn from the reel on the fixed base and pushed through the flexible casing and welding gun by a variable speed feed mechanism which was mounted on the fixed base or trailer. In the welding gun, electricity was transferred to the electrode-filler wire so that a welding arc was established between the end of the wire and the work piece. In this manner the metal of the consumable, electrode-filler wire was deposited and a weld was effected.

The variable-speed feed mechanism which was mounted on the fixed base or trailer is required because different welding work necessitates different rates of feed of the electrode-filler wire. In order to obtain these rates of feed, a high-speed electric motor including an adjustable governing means has been incorporated into the feed mechanism. The adjustable governing means provided the means for setting and maintaining the effective speed of the motor and hence the speed of the wire feed rolls which were operatively connected to the motor and moved the wire. The governing means including its adjuster preferably was a heavy-duty dependable device which is inexpensive and suitable for most operators and shop conditions. One governor which has proved satisfactory is constructed, in principle, similarly to the governor shown in Patent No. 1,767,146, issued to Royal Lee on June 24, 1930. In practice this governing device has been sturdily built with easily-operated and observed control features. As a consequence, the weight of the governor is appreciable.

The governing device operates to intermittently, but frequently, energize the high speed electric motor so that the apparent and practical rate of feed of the electrode filler wire is constant. This is accomplished in the following manner. The speed of the electric motor is transmitted to the governor which includes a centrifugal electrical switch on a rotary disk so that, when a certain speed is exceeded, the centrifugal force will open the centrifugal switch. This, in turn, temporarily de-energizes the electric motor, and the motor slows down so that the contacts of the centrifugal switch close again and permit the flow of current to the motor.

The above-described "push-type" apparatus in which the wire is pushed through the flexible casing and the welding gun was not in some respects completely satisfactory, particularly when used to weld with small diameter wires.

Under certain conditions, the highly desirable constant rate of feed of the wire was not maintained; and, consequently, poor welding and other problems resulted. This improper feeding was caused by frictional resistance in the gun and casing and the deflection of the small wire within the casing. The frictional resistance in the gun is necessary in order to assure the aforementioned transfer of electricity to the electrode-filler wire. For this transfer an electrical contact element is provided in the gun and the wire rubs against this contact element. Prior to this contact, the electrode-filler wire is guided to the gun by the aforementioned flexible casing since the wire itself is not stiff enough to be "pushed" the distance from the fixed base or trailer to the various locations of the welding gun. In the flexible casing, the wire-to-casing clearance cannot be too small or excessive friction will result because of the wire rubbing against the inner surface of the casing. Some clearance, therefore, is necessary. When sufficient clearance is provided in the casing to minimize the inevitable friction therein, the small diameter wire deflectes and bows in the casing until the pushing force of the feed mechanism overcomes the frictional resistance of the contact element in the welding gun. At this point the wire straightens out; and, of course, the cycle begins again. This phenomenon results in a "chatter" effect, causing a rapidly fluctuating or intermittent feed; and unless the apparatus is extremely well designed, the welder will be troubled with variations in the length of the wire extending beyond the welding gun nozzle. At times the projecting end of the wire will lengthen until it tends to jump into the weld pool. At other times, when the deflection of the wire and the subsequent interference with constant feeding occurs, the projected end of the wire near the nozzle will "burn back" and "freeze" in the gun. At other times this "burn-back" will be less and will interrupt the welding operation since the entire operation is dependent, within certain limits, on the arc voltage which, in turn, is dependent upon the distance between the end of the wire and the work piece where the arc exists.

The aforementioned difficulties, caused by wire deflection in the casing, are accentuated, of course, with extremely small wires ($1/32''$ or less in diameter) as may be necessary with certain types of welds on thin workpieces.

The aforementioned flexibility of operation in welding which is provided by having a fixed base, a flexible casing, and a manual welding gun also makes it desirable that the welding gun have good manipulative characteristics. The weight of the gun should be such that an operator can hold the gun in his hand for extended periods of time without excessive fatigue. Also, the gun should not be cumbersome or interfere with good observation of the weld area by the operator. These manipulative characteristics are especially important in the welding systems which are similar to the inert-gas-shielded welding system described in the above-mentioned Muller patent. This recently developed welding system has made possi-"

ble improved and rapid manual welding of aluminum, clad and alloyed steel, and magnesium, for instance. Also, welding in corners, in hard-to-reach locations and overhead (as found, for instance, in ship and aircraft construction) was more easily accomplished with this system. If the welding gun is heavy, causing operator fatigue, errors can result and the rapid deposition of filler wire with the Muller-type system can be very wasteful. Similarly, poor observation of the weld area or difficulties resulting from a cumbersome gun can cause wasteful welding operations or poor welds.

The instant invention provides a suitable arrangement whereby good manipulative characteristics of a welding gun or welding head are obtained and the improper feeding of small-diameter wire is avoided. This is accomplished by separating the feed mechanism so that the speed of the wire feed for control purposes is functional at one point on the wire and the physical feed of the wire occurs at another point on the wire. The actual separation of the feed mechanism is made by dividing the feed mechanism into two units; (1) a speed control unit comprised of the adjustable governor and idler wire rolls, and (2) a wire moving unit comprised of wire moving rolls which are properly actuated or driven by an electric motor. The speed control unit is mounted on the fixed base while the wire moving unit is properly placed on the welding gun. The speed control unit or governor means and the wire moving unit or electric driven means are functionally unified by the electrode-filler wire and an electrical conducting means operatively interconnecting the two units or means. The wire in effect constitutes a mechanical coupling. With this arrangement, the speed of the wire at the fixed base or trailer is effective to open or close the previously mentioned centrifugal switch of the adjustable governor in the speed control unit; and this, in turn, rapidly de-energizes and energizes through an electrical conductor the wire moving unit on the welding gun.

In the prior art, as aforementioned, it is old to push a filler wire from a fixed base or trailer through a flexible casing and welding gun. This arrangement is quite satisfactory for certain relatively stiff welding wires. However, a disadvantage of this push-type of welding apparatus is that it was necessary for the operator to return to the fixed base or portable trailer which carries the adjustable feed mechanism every time that it was necessary to adjust the speed of the feed upon changes in welding conditions. Because of the interruptions in welding and the movement between the work piece and the relatively remotely-located fixed base or portable trailer, many productive man-hours were thus lost.

The instant invention also provides an improved push-type apparatus in which the foregoing disadvantage is eliminated. This is accomplished by utilizing in reverse the previously-described separation of the feed mechanism into a wire moving unit and a speed control unit, which units are functionally unified by the electrode-filler wire and an electrical conductor. In the improved push-type apparatus of the instant invention the wire moving unit or electric driven means is located on the fixed base or portable trailer, and the adjustable speed control unit or governor means is placed on the welding gun in an easily accessible position. The two units are functionally unified by use of the filler wire which constitutes a mechanical coupling and an electrical conductor as previously described in relation to the pull-type apparatus. With this improved push-type apparatus, the adjustments or regulations in the rate of feed of the wire are accomplished simply by turning a knob on the welding gun.

The achievement of the aforementioned objects and the features and advantages of this invention will be apparent from the following detailed description and the attached drawings of preferred embodiments of the invention. In the accompanying drawings.

Figure 1:
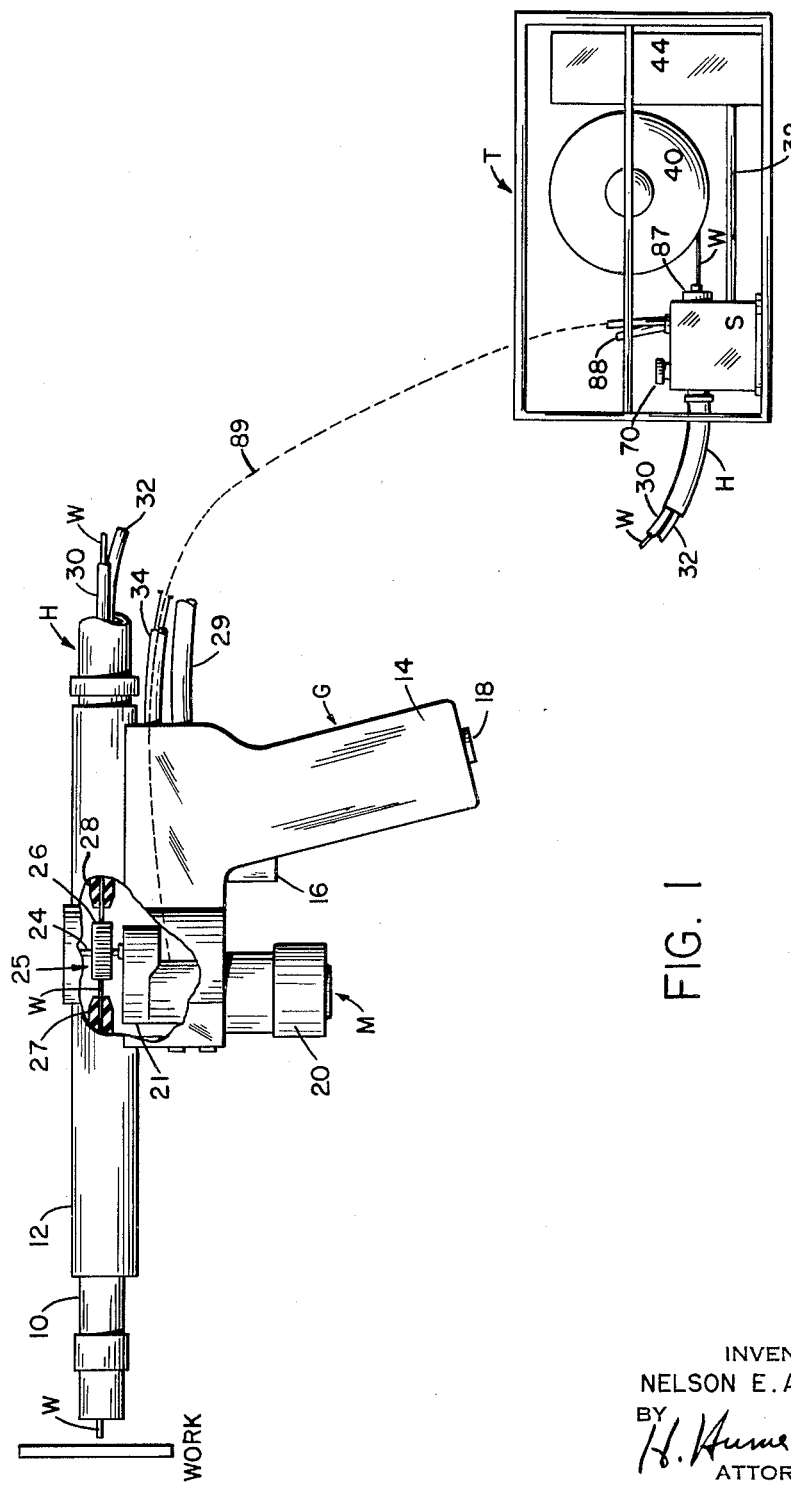
Fig. 1 is a schematic showing of the pull-type welding apparatus, wherein the electric motor of the wire moving unit depends from the gun barrel and the speed control unit is located in front of the wire reel on the fixed base, with parts enlarged and in schematic cross section.

Referring to Fig. 1, it can be observed that the pull-type welding apparatus is comprised of the following major units: a welding gun G, a portable trailer T, and a flexible housing H which extends between the gun and the trailer. The electrode filler wire is indicated by reference character W. The wire W is pulled to the gun G by the wire moving unit M which is mounted on the gun. The rate of feed of the wire is controlled by the speed control unit S which is mounted on trailer T. Except for the wire feeding arrangement which is described in detail hereinafter, the welding apparatus, shown for exemplification of the instant invention, and its operation are substantially as disclosed in the aforementioned Muller patent. For the sake of clearly presenting the instant invention, only the features which are necessary to the instant invention have been shown and are described hereinafter.

The pistol-type welding gun G has a nozzle 10 extending forwardly from barrel 12 which has a handle 14 depending from the rear thereof. The handle 14 has a trigger 16 for initiating the welding operation and a jog button 18 for independently feeding the wire to the gun. The electric motor 20 of the wire moving unit M depends from the intermediate portion of barrel 12. The motor 20 has suitable transmission means or speed reduction means 21 operably connected thereto. A vertical shaft 24 extends up from the transmission means 21 and carries the stationary driven wire tread or feed roll 26 of the wire engaging means 25. In this manner the high speed of the motor is translated by any well-known means into a speed which is proper for wire feed. Structural supports for the various items have not been shown, since they can be any one of many conventional means.

Another wire tread or feed roll which is opposite roll 26 does not appear but is pivoted and suitably tensioned towards roll 26 by means similar to that shown in Fig. 3 which will be subsequently described. Thus the pair of driven rolls or wire engaging means 25 will securely grip the filler wire W, and, when roll 26 is rotated, the wire W will be pulled from the wire reel on relatively remotely-located trailer T. The tread rolls are properly aligned, along with the wire guide tube 28 at the rear of the gun, with the electrical contact element 27 in the forward portion of the barrel 12 so that the wire is fed through the contact element 27 in such a manner that the welding current is effectively passed from element 27 to the wire W. The electrical connections in the gun between element 27 and the welding current cable 29 which enters at the rear of the gun have not been shown, so that the instant invention can be shown more clearly.

At the rear of the gun G, a flexible housing H is suitably coupled to the rear of barrel 12. Within the housing H, wire liner or casing 30 encases filler wire W, and flexible conduit 32 carries inert gas to the gun. Again, in order that the instant invention may be more clearly disclosed, the passages in the gun which would cause a protective inert gas shield to issue around the wire W projecting from nozzle 10 in the manner disclosed in the Muller patent have not been shown. For the details of apparatus which are suitable to form an adequate shield, reference can be had to Patents No. 2,544,711 (issued to Mikhalapov on March 13, 1951) and No.

2,544,801 (issued to Muller and Gibson on March 13, 1951).

Below flexible housing H at the rear of the gun, the above-mentioned welding current cable 29 and the electrical control connections in tubing 34 enter the gun. The various electrical control connections and features, except for the connection 89 (shown in part by a dashed line) between the speed control units and the wire moving unit M, would be similar to those shown in the aforementioned Muller patent and have been omitted in order that the instant invention can be shown more clearly.

The work piece to be welded is shown at the tip or end of the wire W projecting from the welding gun nozzle 10 and in practice is suitably connected to a welding current source by an electrical cable (not shown).

The flexible housing H, carrying the wire W and the flexible gas conduit 32, is shown cut away intermediately with terminal portions coupled to the gun and to the speed control unit S located on the bottom of portable, tubular-framed trailer T. Behind speed control unit S (to be described hereinafter) a wire reel 40 is mounted on trailer or fixed base T. The wire W from reel or wire source 40 feeds through speed control unit S to the wire casing 30 in the flexible housing H and hence to the welding gun G. Inert gas is fed to the gun by conduit 42 leading from the control box 44 to the gas conduit 32 in housing H. The gas admitted to conduit 42 for shielding the wire at the weld area is controlled by a solenoid valve (not shown) in control box 44, which functions to control the entire welding operation and is constructed as explained and described in the aforementioned Muller patent.

Figure 2:
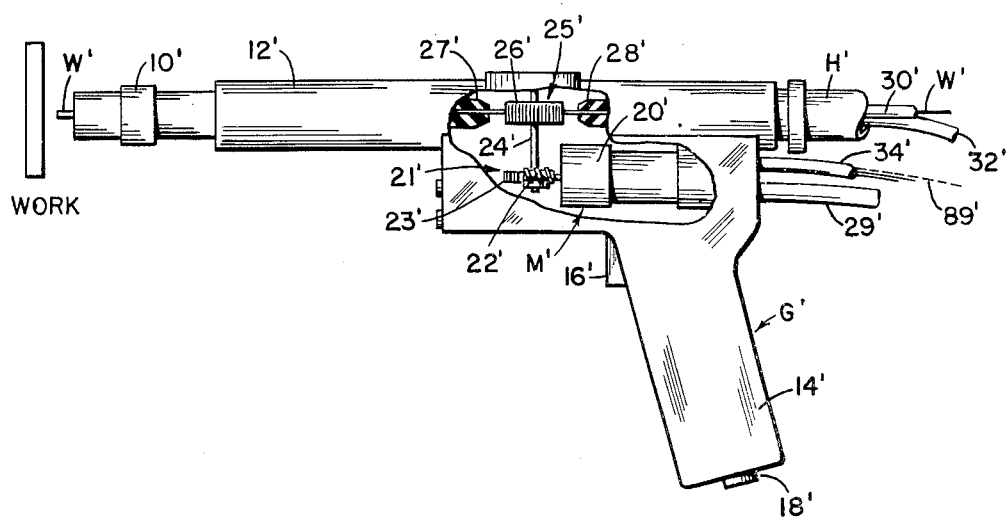
Fig. 2 is a schematic side elevation of a modification of the Fig. 1 welding pull gun with the electric motor positioned in the gun handle.

By reference to Fig. 2 it can be seen that the modified pull-type welding gun illustrated therein differs from the previously-described gun G of Fig. 1 in the location of the wire-moving unit M' in the gun. In place of depending from the gun barrel, parts of the unit M' are located in the gun handle 14'. With this arrangement, another pull-type welding gun is provided which has good manipulative characteristics and yet overcomes the above-mentioned serious difficulties of welding with small diameter wire.

Since most elements of the Fig. 2 welding gun are identical with the elements of the Fig. 1 gun, a detailed description of the modified gun of Fig. 2 is not necessary. Similar elements or parts have been identified by the same reference characters but are primed in Fig. 2 for the purpose of formal differentiation.

The differences of this gun from the gun of Fig. 1 will now be pointed out in detail. The wire moving unit M', except for the wire engaging means 25' in the gun barrel 12', is placed in the gun handle 14'. The tensioned wire engaging means 25' in the gun barrel 12' is operatively connected to the motor 20' by means of the transmission means 21'. The axis of the motor 20' is horizontal and the motor is centrally located in the upper portion of the gun handle. The worm 22' of the transmission means 21' is mounted on the motor's armature shaft and thus extends forwardly and axially from the motor. The horizontally disposed worm gear 23', rotatable on a vertical axis, meshes with the worm 22' and has its upwardly extending shaft 24' connected to tread roll 26' of wire engaging means 25'. It is to be noted that the lateral displacement of the shaft 24' from the vertical plane passing through the center of the welding gun provides a suitable mounting for the driven tread roll 26' of the wire engaging means 25', which necessarily must be laterally-spaced from the axial line of the gun barrel 12' along which the wire W' travels. The previously-described wire guide tube 28 is duplicated in the Fig. 2 gun at 28' in the rear of the gun barrel 12' and, together with the wire engaging means 25', serves to feed properly the wire to the wire contact element 27'.

It should be noted that, by placing the electric motor 20' of the wire moving unit M' in the gun handle 14', the weight of the motor exerts only a downward force to the operator's hand. Also, with this arrangement the gun barrel is free from any depending structure which in some instances would interfere with properly bringing the barrel of the gun to a weld area, such as the bottom of a narrow box-like structure.

Figure 3:
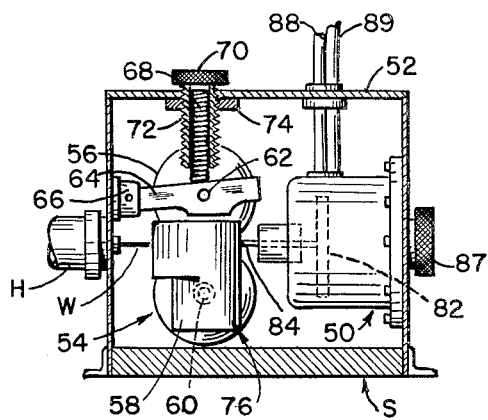
Fig. 3 is a schematic side elevation, partially cross-sectioned, of the speed control unit of the Fig. 1 apparatus.

The construction of the speed control unit S, which is used with the two guns shown in Figs. 1 and 2, is illustrated in Fig. 3 and will now be described. The above-mentioned adjustable centrifugal governing means which has been separated from the remainder of the previously-used feed mechanism is indicated by reference numeral 50 and is mounted on the right wall of the enclosing structure or box 52 of the speed control unit S. The other structure within the box 52 comprises the means for effectively translating the speed of the wire W to the governing means 50. This other structure includes wire engaging means 54, which "picks up" the speed of the wire W just before it enters flexible housing H shown attached to the left side of the speed control box 52. The wire engaging means has an upper tensioned idler roll 56 which is pivotally mounted, and a lower stationary idler roll 58 which is mounted on shaft 60. Both of these rolls and any others mentioned herein may be knurled, if desired, to assure better engagement of the wire. The upper tensioned roll 56 is mounted on shaft 62 which is carried by pivoted support 64. Support 64 is pivoted to the bracket 66 on the left wall of speed control unit box 52. The upper roll 56 is urged into contact with the wire by means of spring 68, which exerts a downward force on the top of pivoted support 64, adjacent to the shaft 62. The force of spring 68 is varied for proper wire engaging contact by putting the spring into more-or-less compression. This is accomplished by turning knob 70 which projects from the upper wall of box 52. Rotation of knob 70 also rotates the hollow, cylindrical, downwardly-extending spring retainer 72 which is rigidly attached to the bottom of the knob 70 and encases the spring 68. This motion causes the spring retainer 72 to ascend or descend as the retainer 72 is threaded or unthreaded into, or out of, its ring support 74 and thus the compression of the spring 68 is varied as required.

The above-described tensioned wire engaging means in the speed control unit substantially corresponds to the previously-mentioned means 25 and 25', for Fig. 1 and Fig. 2 guns and differs in that the rolls are vertically disposed rather than horizontally-disposed as in the manual welding guns. The tensioned wire engaging means 54 is so arranged within the speed control box that the wire W from the wire reel is aligned for entering the wire casing (not shown) within the surrounding flexible housing H.

The transmission means 76 in the speed control unit box 52 serves to transmit the wire speed, in the proper manner, to the governing means 50. In operation the wire speed is relatively slow and, since the governor 50 operates due to centrifugal force, which is created at a high speed, the wire speed must be translated into a higher speed in order that the centrifugal switch of the governor 50 will operate in the manner explained in detail in the aforementioned Lee patent. A typical speed for the wire would be about 200 inches per minute with the roll speed at about 65 R. P. M. By proper design of the transmission means 76, the rotary element 82 of the governor 50 and the motor can both rotate at speeds over 1,000 R. P. M.

Thus, as the wire W rotates the lower idler wire roll 58 and its shaft 60, the rotary disk 82 of the governor 50 on the shaft 84 is actuated and is rotated at a high speed. This high speed causes the peripherally-located contacts of the centrifugal switch on rotary disk 82 to open and to break very temporarily the electrical circuit to the motor of the wire moving unit on the welding gun as previously described.

It is to be understood that in some instances and with proper design the above-described rotary disk 82 can be the stationary wire roll 53 of the speed control unit. This could be done by providing the rotary disk 82 with a peripheral means which would properly engage the wire and by correlating the diameter of the disk 82 with the wire speed so that the centrifugal switch would be operated as desired.

The electrical centrifugal governor 50 is adjusted by governor knob 87 so that the centrifugal switch of the governor is operative at a speed which will result in the proper effective motor speed and hence the proper wire feed, as required by various welding conditions. The electrical conduits 88 and 89 leading from governor 50 are the means for bringing electricity to the governor and therefrom intermittently to the motor of the welding gun. Electrical conductor 89 in actual construction would extend to the welding gun in any suitable manner, and this construction is indicated by a dashed line in Fig. 1.

In the operation of the Fig. 1 pull-type welding system, the operator threads the wire W from speed control unit S and reel 40 through the wire casing 30 in flexible housing H and then through the wire guide tube 28, the wire engaging means 25, and the contact element 27 in the welding gun G. It is to be noted that, since the wire is pulled to the gun, the wire-to-casing clearance can be large and does not have to be small in order to restrain the wire deflection previously encountered. Thus, the threading of the wire through the wire casing 30 is facilitated.

The wire engaging means 25 is properly tensioned to grip the wire, and then the jog button 18 at the bottom of the handle 14 is pressed. By this means the operator causes the wire W to extend the proper distance beyond the barrel nozzle 10 without the welding operation commencing. Finally, the operator commences welding by depressing trigger 16 which causes welding current, inert gas, and wire to be supplied to the welding gun as disclosed in detail in the above-mentioned Muller patent.

During welding, the wire moving unit M on the gun moves the wire W to the weld area by having the wire engaging means 25 rotated by the intermittently-energized high speed electric motor 20 and its transmission means 21. The proper rate of wire speed for a particular welding operation is obtained by turning the control knob 87 of the speed control unit S. The knob 87 functions to adjust the mechanism of the centrifugal mechanism of the governor 50 so that it will operate at a particular speed as explained in detail in the aforementioned Lee patent. Thus, the moving wire at the speed control unit S rotates, through wire engaging means 54 and transmission means 76 (Fig. 3), the centrifugal switch of the governor 50. When a certain speed is exceeded, the switch opens, breaking the motor circuit which includes electric conduit 89 extending between the gun and the trailer, and the high speed electric motor 20 of the wire moving unit M on the gun is temporarily de-energized. As the motor slows down, so does the wire speed at all points, including the point of the speed control unit, and hence the lower wire speed causes a slower rotation of the centrifugal switch. As a consequence, the centrifugal force on the centrifugal switch elements is less and the switch closes, reenergizing the motor of the wire moving unit. This rapid "on-off" operation creates a wire speed which appears and is, for practical purposes, constant.

The operation of the Fig. 2 welding apparatus, which has most of the wire moving unit M' in the welding gun handle 14', is identical with the above-described operation of the Fig. 1 apparatus and therefore a description thereof is not necessary.

With the above-described Figs. 1-3 pull-type welding arrangements, the small-diameter wire is pulled to the welding gun, and the troublesome deflection of wire as encountered in the push-type apparatus is avoided. Furthermore, the welding guns have not been made unduly heavy or cumbersome by adding the entire feed mechanism of prior apparatus to the guns. Thus, the sometimes wasteful and troublesome feeding problem of existing push-type apparatus when welding with small diameter wire is overcome without the disadvantage of impairing the manipulative characteristics of the welding gun by adding dependable and inexpensive electrical centrifugal governing means to the welding gun.

The incorporation of the instant invention in a push-type welding apparatus in which the rate of feed of the wire can be adjusted at the welding gun will now be described with reference to Fig. 4.

Figure 4:
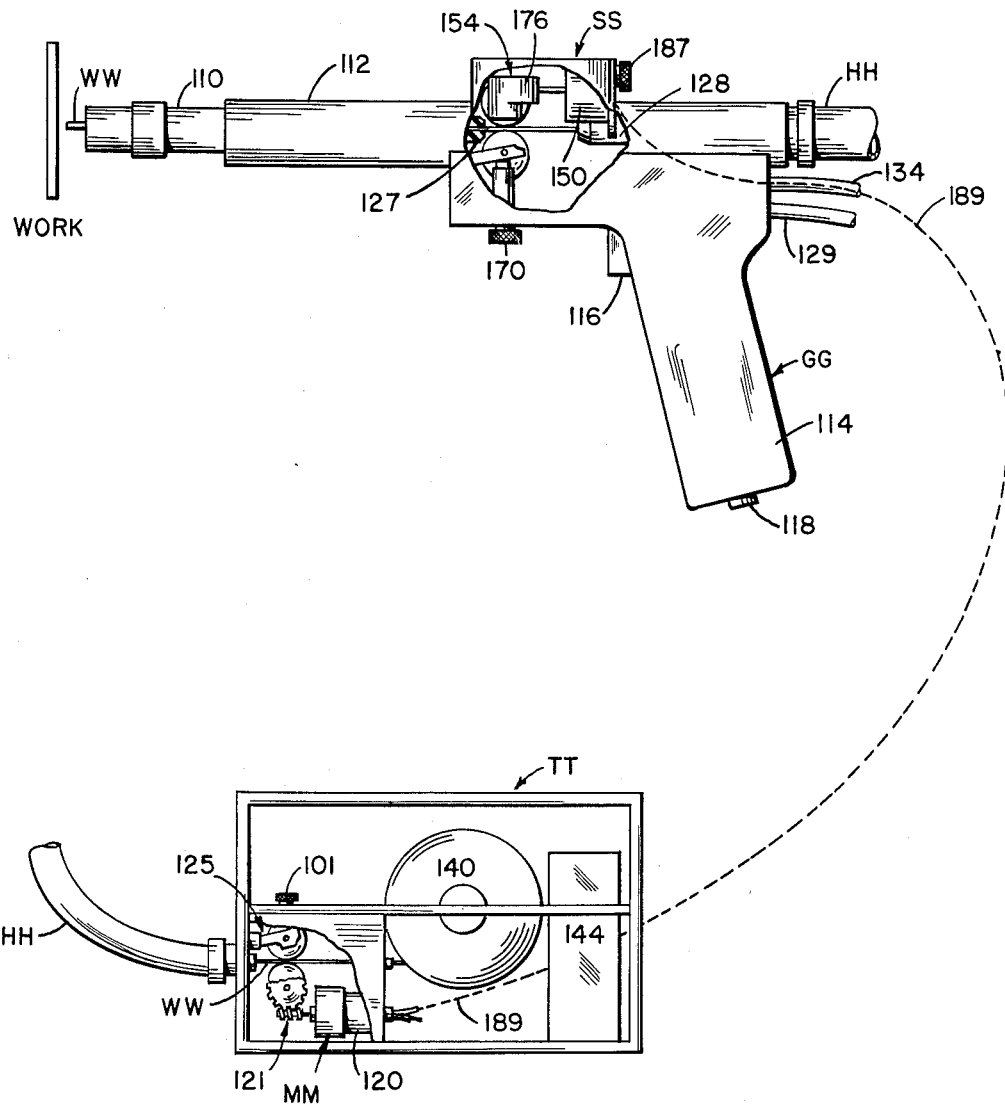
Fig. 4 shows the improved push-type welding apparatus and has an enlarged schematic cross-section of a welding gun showing the adjustable speed control unit conveniently incorporated in the gun.

The elements of the welding apparatus shown in Fig. 4 which are identical with the elements of the Figs. 1 and 3 apparatus are given similar reference characters. For instance the gun barrel, previously designated by 12, is identified by 112. The major units have the previously-used symbol doubled. Thus, the trailer in Fig. 4 corresponding to the Fig. 1 trailer T is designated TT. Since reference can be had to the previous description, the Fig. 4 push-type apparatus will be described hereinafter only to the extent which is necessary to point out the embodiment of the invention in a push-type apparatus.

In the preferred embodiment shown in Fig. 4 the wire WW is pushed through the wire casing (not shown) in flexible housing HH and the elements of the welding gun GG, as previously described in relation to push-type operations. The speed control unit SS, however, is mounted on the welding gun and serves, as previously described, to govern the wire moving unit MM, which is located on the trailer TT in this push-type embodiment. In this manner the operator can easily adjust the wire feed by means of knob 187 on the welding gun GG.

In order to regulate the wire speed at the gun, the speed control unit SS is suitably mounted on the gun GG and is functionally unified with the wire moving unit MM on the trailer TT by means of the wire WW and electrical conductor 189 which extends between SS and MM (shown in part by a dashed line). This conductor 189 forms the electrical supply circuit of the motor 120. The electrical centrifugal switch of the speed control unit SS is interposed in this circuit. The speed control unit SS is mounted in the gun in such a manner that the wire engaging means 154 contacts the wire extending between the electrical contact element 127 and the wire guide tube 128 in the gun barrel 112. The feed or tread rolls of the wire engaging means 154 are disposed vertically on horizontal shafts. The stationary upper roll actuates transmission 176 which, in turn, causes rotation of the rotary disk carrying the centrifugal electrical switch of the governor 150. Adjustments in the wire speed are made by means of knob 187 on the gun which varies the speed at which the centrifugal switch operates as previously described in relation to Fig. 3.

It is, of course, obvious that the axes of the various elements such as the rolls, transmission means, etc. can be varied so that the governor knob 187 projects from the side of the gun, rather than from the top as shown.

The speed control unit SS on the gun GG has a tensioned wire engaging means 154 similar to the Fig. 3 wire engaging means 54. The proper tension is effected by means of knob 170 which extends downwardly from the forward portion of the upper part of the gun handle 112 adjacent trigger 116. It is to be noted that the Figs. 1 and 2 apparatus have this type of wire engaging means but with the rolls being horizontally disposed.

Referring now to the trailer TT shown in Fig. 4, it can be seen that the flexible housing HH from the gun GG terminates at the box-like structure of the wire engaging means 125 of the wire moving unit MM at the bottom of the trailer TT, forward from the wire reel 140. The knob 101 shown extending from the top of means 125 is for tensioning the wire thread rolls which only partially appear but which, along with the tensioning means, are similar to the corresponding means in Fig. 3.

The worm gear and worm transmission 121 are schematically shown extending from the visible full side of the wire engaging means 125. The high speed electric motor 120 extends to the right from the transmission 121 and below the level of the wire WW. The previously-mentioned electrical conductor 189 leads from the motor and extends by a dashed line to the rear of the gun and hence to the governor 150 so that the opening and closing of the centrifugal electrical switch of the governor 150 on the gun rapidly energizes and de-energizes the motor 120 on the trailer.

It is believed that the operation of the above-described push-type welding apparatus is obvious in view of the description of the Figs. 1–3 pull-type apparatus. It is to be noted, however, that the advantage of this push-type apparatus is to permit the welding operator to adjust conveniently the wire speed at the manual welding gun when welding with wire and apparatus in which push-type feeding is satisfactory. With this arrangement it is not necessary for the operator to return to the portable trailer TT where the entire feed mechanism was previously located and, thus, a saving in man-hours results.

It is also to be noted that the above-described advantageous arrangement of a push-type apparatus is possible by means of the concept of separating the feed mechanism into a wire moving unit and a speed control unit and functionally unifying the remotely-located units by means of the welding wire and an electrical conductor.

Although the invention is shown as applied to a consumable electrode-filler wire welding system, it is believed to be apparent that the novel coupling of a governor to a motor by means of a welding wire and electrical connection could be applied to the separate filler wire feed means of a welding system using a non-consumable electrode where similar problems exist. Thus, the invention can be used to bring filler wire to any welding head, including a gas welding head.

The invention is shown and described as using inert gas shielding. It is to be understood that the invention can be equally useful without gas shielding as in a flux-submerged arc welding system.

It will be understood that this invention is not limited to the specific illustrative embodiment thereof described above in detail, but includes such modifications thereof as fall within the scope of the appended claims.

I claim:

1. Welding apparatus in which a welding wire is continuously fed to a welding head and deposited in the weld being formed which comprises a source of wire and a welding head remote from said source of wire, electric motor-driven means capable of acting on said wire to propel said wire longitudinally from said source to said welding head, governor means remote from said electric motor-driven means and capable of being actuated solely by the longitudinal motion of said wire and responsive to changes in speed of said wire, and electrically conducting means operatively interconnecting said governor means and said motor-driven means.

2. A welding apparatus comprising a manual welding gun, a first wire engaging means on said gun for pulling a welding filler wire to said gun, said wire engaging means being actuated through transmission means by a high speed electric motor, a second wire engaging means remotely located from said welding gun and actuated solely by the longitudinal motion imparted to said wire by said first wire engaging means, said second wire engaging means being operatively connected to an adjustable high speed centrifugal electrical switch, and an electrical supply circuit to said high speed electric motor which is controlled by said switch.

3. A welding apparatus in which wire is pushed to a weld area, said apparatus comprising a welding gun, an adjustable speed control unit including wire engaging means on said gun responsive solely to longitudinal movement of wire therethrough, an electrically operated wire moving unit including a second wire engaging means, said wire moving unit being spaced remotely from said gun, and an electrical connection between said control unit and said wire moving unit; whereby the longitudinal speed of the wire at the control unit is operative to control the rate of wire feeding by the wire moving unit at the welding gun.

4. A welding system in which a welding wire is fed continuously during welding to the weld area comprising electrically operated means acting on the wire at a given point for propelling the wire longitudinally, control means actuated solely by the longitudinal motion of the wire at a point remote from said given point, and electrical means interconnecting said control means and said propelling means whereby said propelling means is controlled by the longitudinal motion of said wire through said control means.

5. Arc welding apparatus comprising a welding head, a supply of welding wire remote from said welding head, wire feed roll means actuated by an electric motor to withdraw said welding wire from said supply and propel it longitudinally through said welding head, driven roll means remote from said wire feed roll means and actuated solely by the longitudinal movement of said wire in contact with said driven roll means, a motor governor actuated by said driven roll means, and means interconnecting said motor governor and said motor whereby the speed of said motor is controlled by said governor.

6. A welding system according to claim 4 in which a flexible conduit of fixed length encloses the wire from the point at which the propelling means acts on the wire to the point at which the control means is actuated by the wire.

7. Arc welding apparatus comprising a welding head, a wire reel remote from said welding head containing a length of electrode wire, electrically driven wire feed means acting on said wire to withdraw said wire from said reel and feed it through said head, an idler roll remotely located with respect to said feed means and in rolling engagement with said wire, and electric switch means in a circuit that controls the operation of the electrically driven wire feed means, said switch means being responsive to the angular velocity of said idler roll.

References Cited in the file of this patent

UNITED STATES PATENTS

| | | |
|---|---|---|
| 1,524,557 | Kenyon | Jan. 27, 1925 |
| 1,738,573 | Goodspeed | Dec. 10, 1929 |
| 1,927,896 | Meller | Sept. 26, 1933 |
| 2,510,205 | Baird | June 6, 1950 |
| 2,571,684 | Craven | Oct. 16, 1951 |